United States Patent [19]
Oyanagi et al.

[11] Patent Number: 5,898,553
[45] Date of Patent: Apr. 27, 1999

[54] MAGNETIC DISK AND MAGNETIC DISK UNIT

[75] Inventors: Eiki Oyanagi; Osamu Morita, both of Miyagi, Japan

[73] Assignee: Sony Corporation, Tokyo, Japan

[21] Appl. No.: 08/859,268

[22] Filed: May 20, 1997

[30] Foreign Application Priority Data

May 20, 1996 [JP] Japan ................................. 8-150023

[51] Int. Cl.⁶ ........................................................ G11B 5/82
[52] U.S. Cl. ...................................................... 360/135
[58] Field of Search ...................................... 360/135, 131

[56] References Cited

U.S. PATENT DOCUMENTS

| | | | |
|---|---|---|---|
| 5,285,343 | 2/1994 | Tanaka et al. ........................ | 360/135 X |
| 5,328,740 | 7/1994 | Nakayama et al. .................. | 360/135 X |
| 5,388,020 | 2/1995 | Nakamura et al. ................... | 360/135 |
| 5,402,278 | 3/1995 | Morita .................................. | 360/135 X |
| 5,427,833 | 6/1995 | Nakayama et al. .................. | 360/135 X |
| 5,504,646 | 4/1996 | Tanaka et al. ........................ | 360/135 |
| 5,537,282 | 7/1996 | Treves et al. ......................... | 360/135 |
| 5,569,518 | 10/1996 | Hayashi ............................... | 360/135 X |
| 5,576,918 | 11/1996 | Bar-Gadda et al. .................. | 360/135 |
| 5,768,076 | 6/1998 | Baumgart et al. .................... | 360/135 |

*Primary Examiner*—John H. Wolff
*Attorney, Agent, or Firm*—Hill & Simpson

[57] ABSTRACT

A magnetic disk unit provided with a magnetic disk, a slider operatively configured and supported on a pivoting arm, a vertical recording magnetic head provided on said slider, and an information record section provided on the magnetic disk in the form of protrusions covered with magnetic material, said information record section accepting a vertical magnetic recording signal from said vertical magnetic recording head, thus providing a magnetic head operated with a small lift amount to suppress spacing loss in the vertical magnetic recording and improved recording and reproducing performance of a vertical magnetic recording disk unit system.

3 Claims, 10 Drawing Sheets

MAGNETIC DISK AND MAGNETIC DISK UNIT

BACKGROUND OF THE INVENTION

1. Field of the Invention

This invention relates to a magnetic disk and magnetic disk unit provided with this disk for recording and reproducing data and programs by means of a magnetic head mounted on a floating head slider.

2. Description of Related Art

Computer systems, for example, utilize a hard disk unit as the magnetic disk unit. The magnetic disk housed inside this hard disk unit is covered with a magnetic film on both surfaces and data is recorded or reproduced in a track configuration on this magnetic film by means of a magnetic head mounted on a floating head slider "above" both sides of the magnetic disk.

Because such a magnetic disk is covered with a magnetic film on both entire surfaces and magnetized in the longitudinal magnetic recording direction namely in the direction horizontal to a magnetic film, the width of a guard band provided between adjacent data tracks should be inevitably relatively wide in order to suppress crosstalk from adjacent data tracks. As a result, the width of a track pitch cannot be narrow, and a small-sized hard disk with large recording capacity has not been realized. This is a problem.

To solve this problem, a vertical magnetic recording magnetic disk namely, a magnetic disk magnetized in the direction perpendicular to the magnetic film, has been proposed. The recording density of a magnetic disk is determined by the product of line density and track density. A recording signal with short wavelength may be employed to increase the line density, this means that magnetization reversal width for signal recording is reduced, Generally in the comparison of a vertical magnetic recording system with a longitudinal magnetic recording system, it is said that the magnetization reversal width is smaller for a vertical magnetization recording system than for a longitudinal magnetization recording system. The difference is attributed to the fact that the magnetization reversal region in a longitudinal magnetic recording system is composed of the same polar magnetic poles, on the other hand, the magnetization reversal region in a vertical magnetic recording system is composed of the different magnetic poles. Therefore, a guard band between data tracks of a magnetic disk of the vertical magnetic recording system can be relatively narrow, and a small-sized hard disk unit with large recording capacity can be realized.

According to the above-mentioned magnetic disk of the vertical magnetic recording system, the high recording density can be realized.

However in the vertical magnetic recording system, because the spacing loss due to the distance between a magnetic disk and a magnetic head is serious, it is necessary to reduce the lift amount between a magnetic disk and a head slider as small as possible.

OBJECT OF THE INVENTION

It is the object of the present invention to provide a magnetic head operated with a small lift amount to suppress the spacing loss in the vertical magnetic recording and improved the recording and reproducing performance of a magnetic disk unit of the vertical magnetic recording system.

DETAILED DESCRIPTION OF THE PREFERRED EMBODIMENTS

Figure 1:
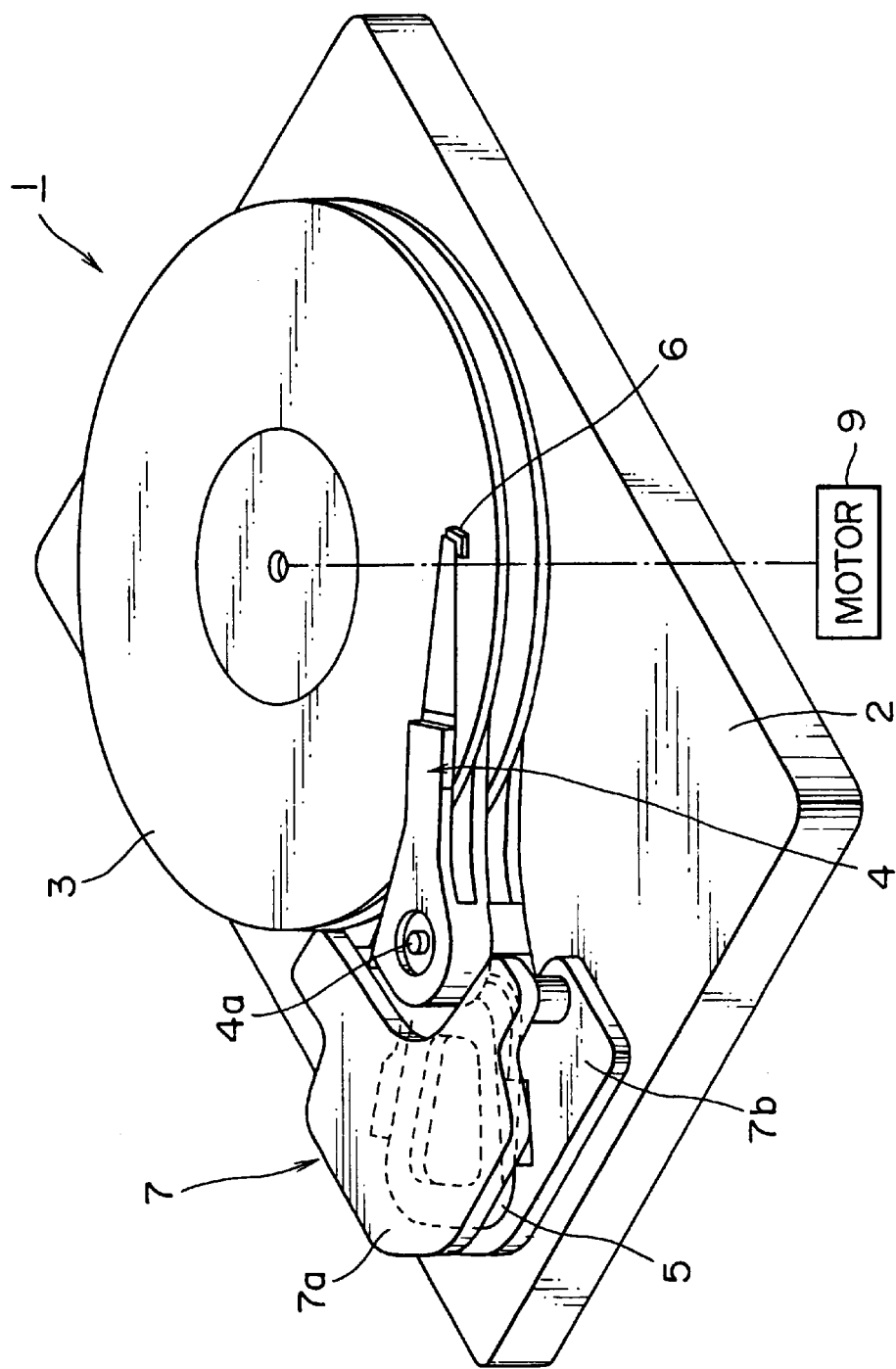
FIG. 1 is an oblique view of the structural layout of the hard disk device of the embodiment of this invention.

FIG. 1 is an oblique view showing the structure of the hard disk unit as an embodiment of the magnetic disk unit of this invention.

This hard disk unit 1 comprises a spindle motor 9 at the rear side of a flat portion of a chassis 2 formed of aluminum alloy and a magnetic disk 3 driven at fixed angular speed by the spindle motor 9. An arm 4 is mounted for revolving around the perpendicular shaft 4a on the chassis 2. A voice coil 5 is mounted at one end of this arm 4. A head slider 6 is mounted at the other end of the arm 4. The voice coil 5 is installed to be interposed between a magnet 7a and a magnet 7b. A voice coil motor 7b is formed by means of the voice coil 5 and the magnets 7a and 7b.

Figure 2:
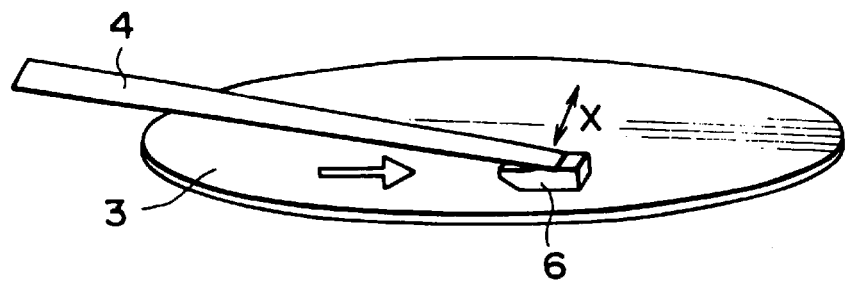
FIG. 2 is an oblique view showing the operation of the head slider of the hard disk device of this invention.

In the above structure, when an external electrical current flows into the voice coil 5, the arm 4 starts to rotate around the perpendicular shaft 4a due to the current flowing in the voice coil 5 and the magnetic field of the magnets 7a and 7b. Thereby the head slider 6 attached to the other end of the arm 4 can move radially along the magnetic disk 3 in the direction of the arrow X shown in FIG. 2. The magnetic head 8 (see FIG. 3) mounted on this head slider 6 can then search (seek operation) the magnetic disk 3 and perform record and reproduction of data on the specified track.

Figure 3:
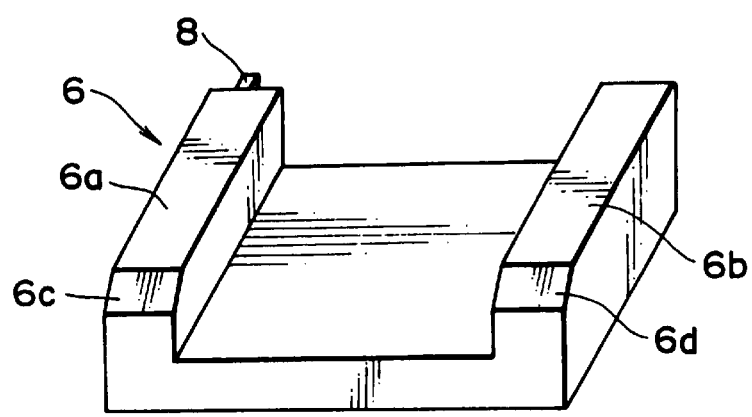
FIG. 3 is an oblique view showing a detailed example of the head slider of the hard disk device of this invention.
Figure 4:
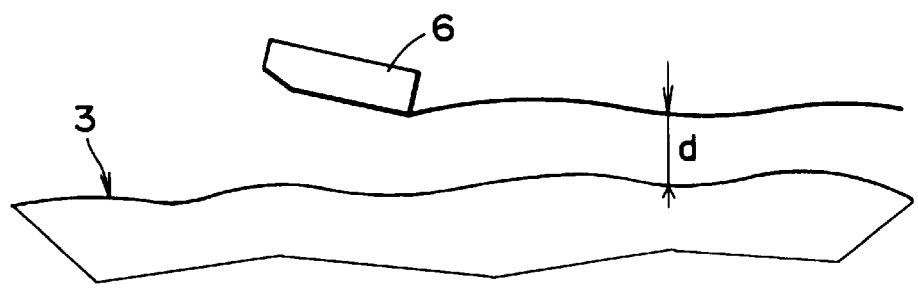
FIG. 4 is a side view showing operation of the head slider of the hard disk device of this invention.

This head slider 6 is formed with rails 6a and 6b as an air bearing surface on both sides of the lower surface as shown in FIG. 3 and with taper sections 6c and 6d on the air in-flow end of these rails 6a and 6b. This arrangement permits an air flow to provide lift between the surfaces of the magnetic disk 3 and the rails 6a and 6b accompanying the rotation of the magnetic disk 3 when the head slider 6 has approached the surface of the rotating magnetic disk 3. This lift force permits a minute gap (lift amount) D to be maintained by the head slider 6 and the magnetic head 8 from the surface of the magnetic disk 3 as shown in FIG. 4.

Figure 5:
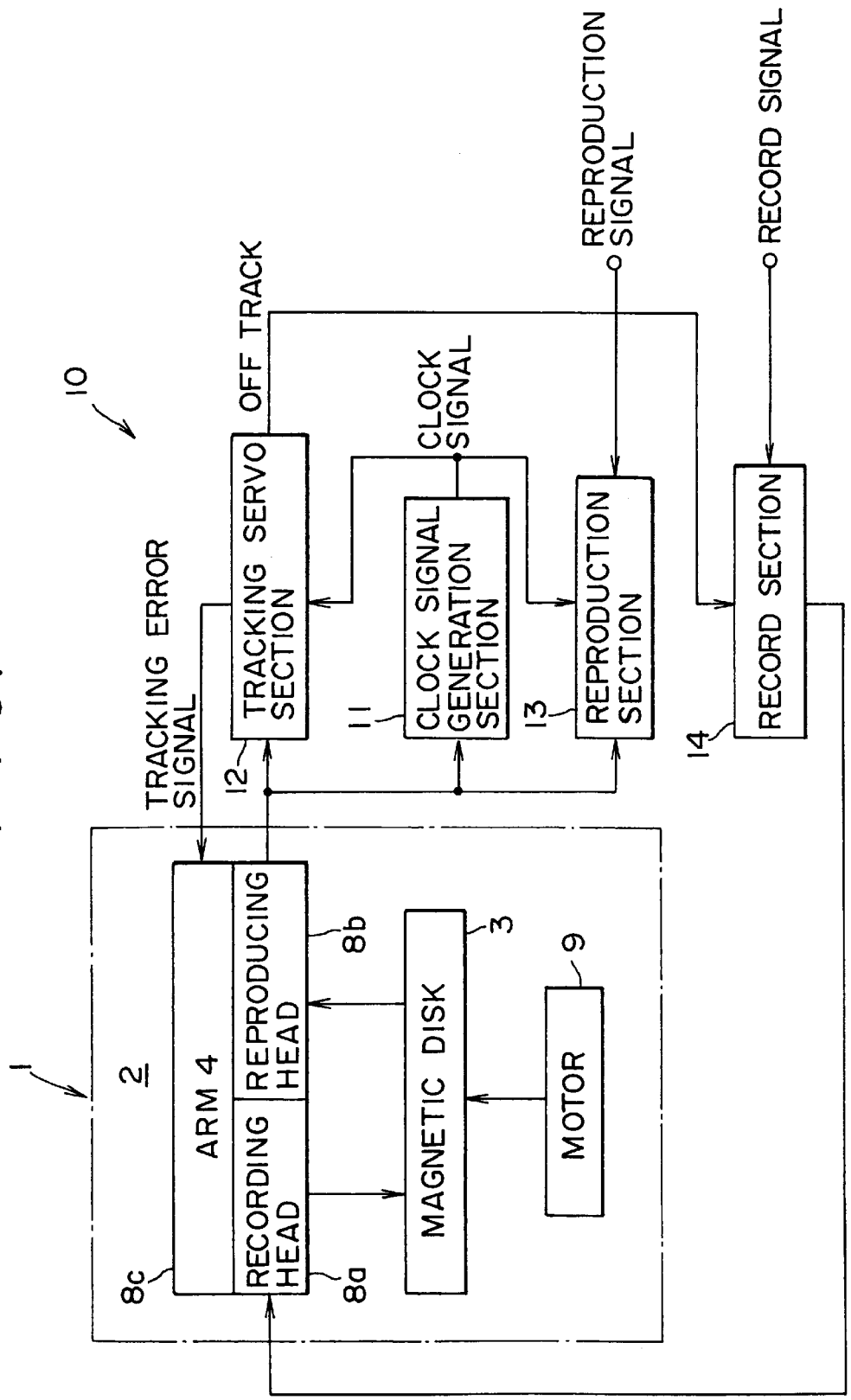
FIG. 5 is a block diagram showing the structure of the control section of the hard disk device of this invention shown in FIG. 1.

FIG. 5 is a block diagram showing a typical structure of the control section for the hard disk unit of FIG. 1.

The clock signal generator 11 of the controller 10 generates a clock signal from the signal reproduced by the reproduce head 8b of the magnetic head 8 and this clock signal is sent to the tracking servo 12 and the reproduction section 13. The tracking servo 12 refers to the clock signal from the clock signal generator 11, generates a tracking error signal by means of the signal from the reproduction head 8, and drives the arm 4 versus these signals. This arrangement allows tracking control of the record head 8a and the reproduction head 8b for a designated position on the magnetic disk 3. The record section 14 modulates a record signal supplied from a circuit not shown in the drawing and records on the magnetic disk 3 by means of the record head 8a. The reproduction section 13 demodulates the record signal from the reproduction section head 8b and sends it to the circuit mentioned above. The tracking servo section 12 monitors the tracking error signal and regulates the record section 14 and stops record operation if a large shock is applied to the magnetic disk device or if the magnetic head 8a deviates from the data track.

Figure 6:
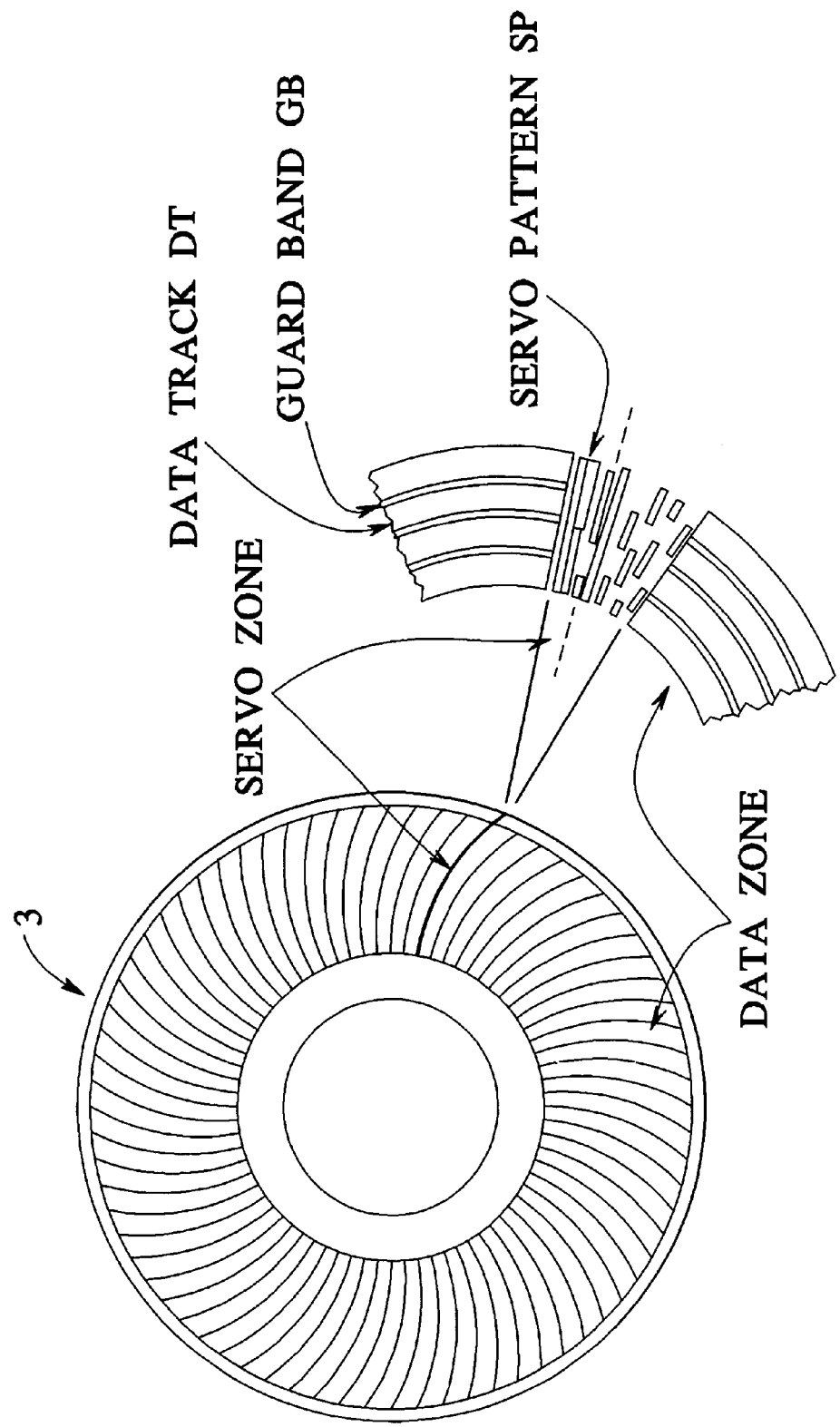
FIG. 6 is a plane view showing an embodiment of the magnetic disk of this invention.

FIG. 6 is a plane view of an embodiment of the magnetic device of this invention.

The base 31 made from such materials as plastic, glass or aluminum has data record zones (data zones) and control signal record zones (servo zones) respectively formed radially and a magnetic film 32 is formed on the surface. More specifically, a data track for recording data in concentric data zones is formed to have protrusions and the guard band GB for separating the adjacent data zones is formed with concavities. The gray code for specifying a particular data track DT, the clock mark for dividing one cycle equally, and servo patterns such as the wobble mark for controlling the tracking of the magnetic head 8 are also formed on the servo zone. This servo pattern SP can be formed as a protrusion or may be formed as a concavity.

Figure 7:
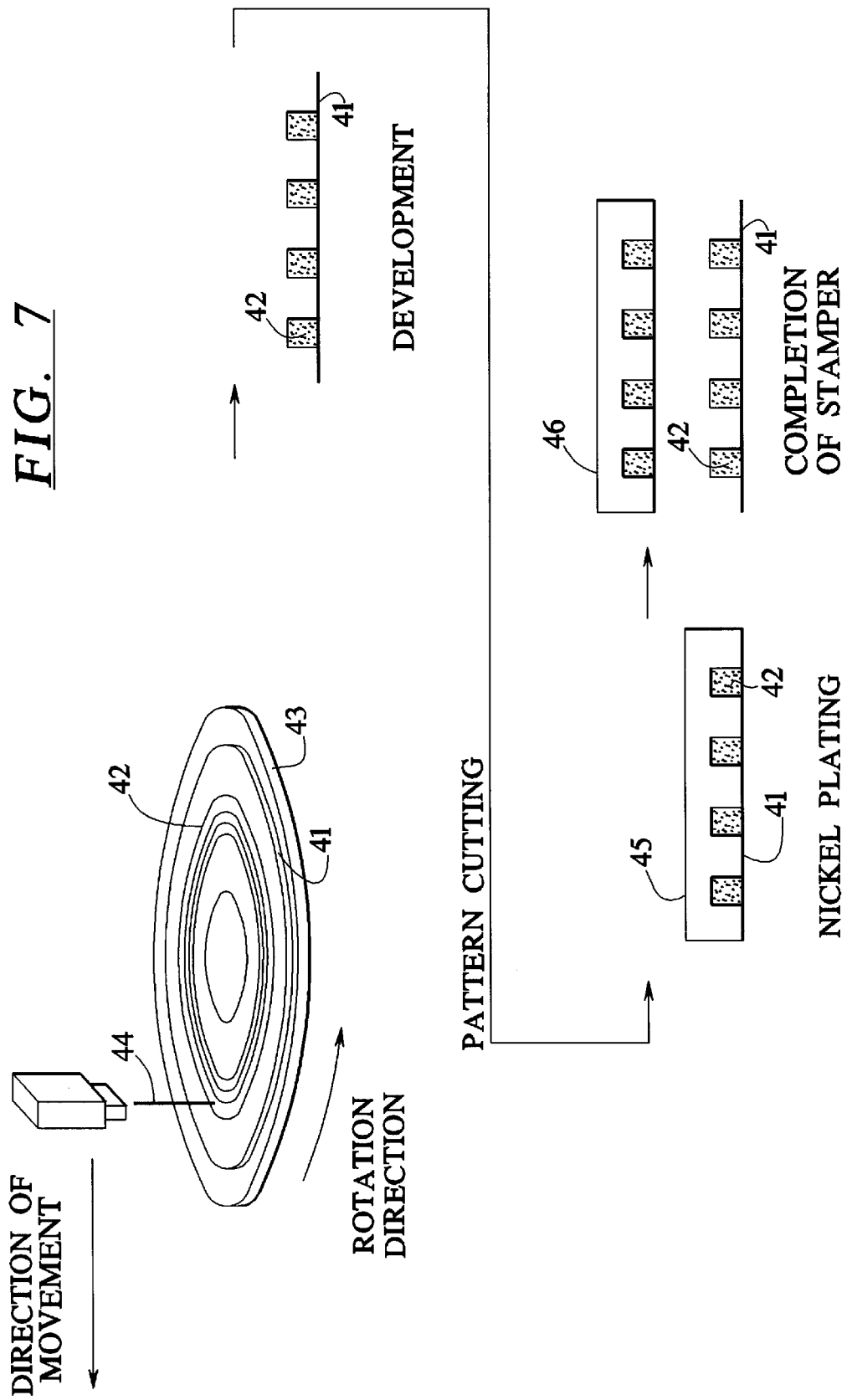
FIG. 7 is a first view describing the manufacturing method of the magnetic disk shown in FIG. 6.
Figure 8:
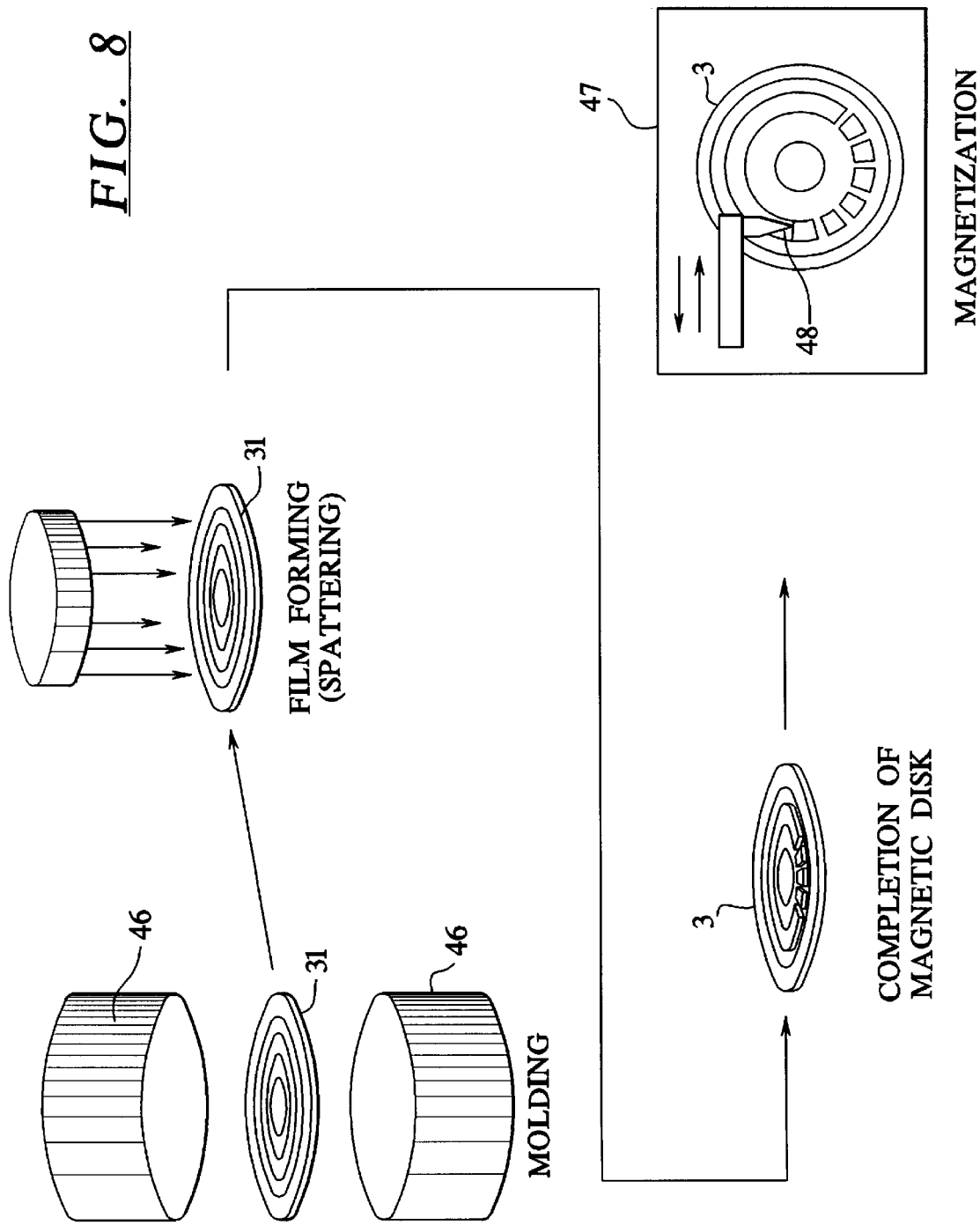
FIG. 8 is a second view describing the manufacturing method of the magnetic disk shown in FIG. 6.

The above described magnetic disk 3 can be manufactured by utilizing optical technology. That manufacturing method is described in FIG. 7 and FIG. 8.

First, the surface of a glass plate 41 is coated for instance with a photoresist 42. This glass plate 41 coated with the photoresist 42 is placed on a turntable 43 and rotated and for instance a laser beam 44 beamed upon only the portions with the photoresist 43 for forming the irregularities by laser beam pattern cutting. After cutting with the laser beam 44, the photoresist 42 is developed and portions of the photoresist 42 through which light is leaking are eliminated. A nickel plating 45 is formed on the glass plate 41 whose surface light leaks have been removed. Then this nickel plating 45 is stripped from the glass plate 41 and the stamper 45 then is set.

The base 31 is then formed by using the stamper 46. A magnetic film 32 is formed on the surface of the base 31 by a method such as sputtering to form the magnetic disk 3.

The magnetic disk 3 is placed inside the magnetizer unit 47 and rotated. The direct current is next applied to the magnetizing head 48 while the magnetizing head 48 is moved at the track pitch radially above the magnetic disk 3 to magnetize in the vertical direction the protrusions and concavities of the magnetic film 32 on the magnetic disk 3.

According to the hard disk device provided with a magnetic disk 3 having such structure, because guard bands GB are formed as physical concavities between data tracks DT, bleeding of recording signal is prevented and bleeding of reproducing signal due to spacing is reduced. Therefore, the use of a wide guard band for mitigating stroke is unnecessary, the narrow track pitch favors the high track density, and brings about the improved recording density.

Usually, the vertical magnetic recording system is disadvantageous in that noise is generated due to the in-producing movement of magnetic domains of high magnetic permeability layer provided under the magnetic recording layer. However in the case of the above-mentioned magnetic disk 3, because the high magnetic permeability layer, magnetic layer, and protection layer are successively formed on the base 31, the protrusions and concavities of the base 31 is revealed on the high magnetic permeability layer, and the magnetic domains of the high magnetic permeability layer is fixed. Therefore, a high quality signal is obtained without noise (S/N) even though the vertical magnetization recording system is employed.

In the case of the magnetic disk 3, the protrusions and concavities support the head slider 6. If the lift amount of the head slider is reduced as thin as possible, the air film above a protrusion is very thin and the property of hydrodynamic air film spring is lost, on the other hand, the air film above a concavity is still sufficiently thick to retain the hydrodynamic air film spring property. This means that the head slider 6 which is floating on such protrusions and concavities of the magnetic disk 3 can float more stably near the surface of the magnetic disk 3 than the head slider 6 which is floating above the flat surface of a magnetic disk like the conventional magnetic disk.

Because the pressure exerted from the magnetic disk 3 to the head slider 6 is constant in the direction perpendicular to the moving direction of the head slider 6, the pressure is determined dependently on the area ratio of the protrusion and the concavity. In other words, the lift amount of the head slider 6 can be made thin by designing the protrusion area larger than the concavity area. However, the smaller concavity area results in smaller information recording and reproducing region and leads to unstable recording and reproducing, therefore it is required to consider the area ratio of protrusion and concavity.

Further, in the case of a conventional magnetic disk, there is no difference between the disk surface of a servo zone and a data zone, and the lift amount of the head slider 6 depends significantly on the configuration of the head slider 6. Therefore, in the case of a conventional magnetic disk, the evenness of the texture of the whole disk surface is managed. However, in the case of a magnetic disk 3, the pattern of the servo zone and data zone is different each other as shown in FIG. 6. The height of the protrusion is equal to or higher than that of the texture. The size of the protrusion and concavity is approximately equal and is about several $\mu$m, and approximately equal to the texture. From the above description, the difference in pattern between the servo zone and data zone means that the evenness of the texture of a conventional magnetic disk is different between the servo zone and data zone (¥1). Therefore, it is required to optimize the arrangement of the servo zone lines in order to reduce the lift amount of the head slider 6.

First, the fluctuation in lift of the head slider above the flat plane like the conventional magnetic disk and the fluctuation in lift of the head slider above the protrusion and concavity plane like the magnetic disk 3 were investigated. Next, the fluctuation in lift of the head slider 6 dependent on the difference in the arrangement of the servo zone lines was investigated.

First, the first measurement disk was made of glass, and only data zones were formed coaxially between a radius from 15.5 mm to 20.5 mm like an actual magnetic disk 3. The width of a data track on a data zone namely the width of a protrusion is 3.2 µn, and the width of a guard band GB namely the width of a concavity is 1.6 µm. A flat ring area with a width of 0.4 mm was formed for lift measurement.

The pattern of the data zones on the glass disk was formed in the same way as the actual magnetic disk 3. A coating of resist was first applied to the glass disk surface and the data zone pattern was exposed to light based on the cutting data on the resist. After exposure, developing was performed, for instance, by RIE (reaction ion etching) to form the data zone pattern.

The head slider 6 is typically comprised of two nanosliders rails with a 50 percent flat taper. The slider length is 2.0 mm, slider width is 1.6 mm, the rail width is 200 µm, and the load is 3.5 gf. A rail with a width of 50 µm for measurement is formed between the rail and rail namely on the center line of the head slider 6. The measurement rail does not affect directly the lifting of the head slider 6 because the measurement rail is sufficiently thin in comparison with the two rails. Such head slider 6 is positioned above the data zone and flat plane of the glass disk and the lift of the head slider 6 was measured with varying relative speed between the head slider 6 and glass disk.

Figure 9:
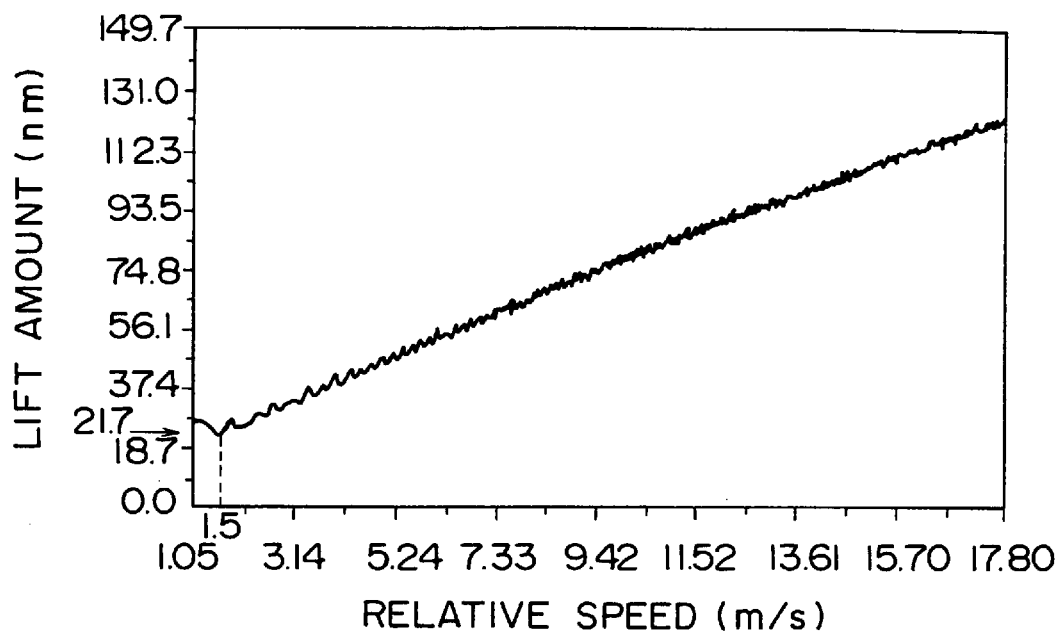
FIG. 9 is a graph showing the relationship between the lift amount of a head slider and the relative speed of a head slider 6 to the glass disk when the head slider of the hard disk device shown in FIG. 1 is positioned above the flat surface of the glass disk.
Figure 10:
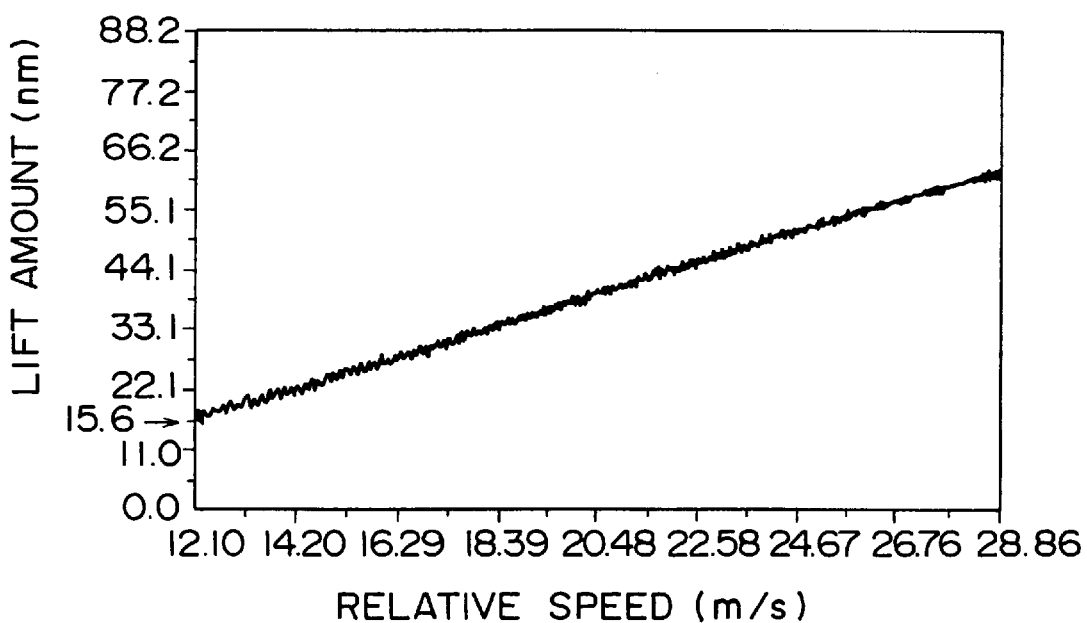
FIG. 10 is a graph showing the relationship between the lift amount of a head slider and the relative speed of a head slider 6 to the glass disk when the head slider of the hard disk device shown in FIG. 1 is positioned above the data zone of the glass disk.

FIG. 9 shows the relationship between the lift of the head slider 6 and the relative speed between the head slider 6 and glass disk for the case of the head slider 6 positioned above the flat plane of the glass disk, and FIG. 10 shows the relationship between the lift of the head slider 6 and the relative speed between the head slider 6 and glass disk for the case of the head slider 6 positioned above the data zone.

The fluctuation in lift of the head slider 6 was measured by means of a laser vibrometer by way of a method in which a reference light for reference was irradiated onto the lift measurement area on the glass disk and a measurement light was irradiated onto the measurement rail of the head slider 6, and the difference was used to determine the fluctuation, during a period while the glass disk is rotated at a speed sufficiently fast to lift the head slider, afterward the rotation speed of the glass disk is lowered gradually until the glass disk touches the head slider 6.

The lift of the head slider 6 positioned above the flat plane of the glass disk of the head slider 6 becomes unstable at the relative speed between the head slider 6 and the glass disk of 1.5 m/s, and the lift just before the contact between the head slider 6 and the glass disk is 21.7 nm. On the other hand, the lift of the slider head 6 positioned above the data zone of the glass disk does not become unstable and is 15.6 nm even at the relative speed between the head slider 6 and the glass disk of 12.1 m/s, the lift of 15.6 nm is lower than lowest lift of the head slider 6 positioned above the flat plane.

The width of the protrusion which maximizes the ratio of the protrusion is equalized to the track width serving for reading and writing record information, the lift is thereby minimized most stably without reducing the recording density. The magnetic disk 3 having protrusions and concavities is more suitable for the vertical magnetic recording system than the conventional flat magnetic disk because the former can realize the lower lift of the head slider 6, and the recording density is thereby increased.

Next, the measurement disk is also made of glass, and provided with data zones and servo zones as an actual magnetic disk 3. The data zones and servo zones on the glass disk were formed in the same way as an actual magnetic disk. First, resist was coated on the glass disk surface, a pattern of the data zones and servo zones was exposed to light based on the cutting data. After exposure, the resist was developed for instance by way of RIE (reactive ion etching) to form the data zones and servo zones.

A track pitch of a data track DT of the data zone was 4.8 µm, a track width was 3.2 µm, and the depth of a guard band GB namely the depth of a concavity is 200 nm.

The servo zones were formed in a curve along the seek path of the head slider 6 and not in a direct line from the inner to the outer circumference as was the actual servo zones. The number of servo zones were different dependently on the three regions in the circumferential direction of the glass disk in the head slider length projected on the glass disk as described herein under. The servo pattern depth in the servo zone or in other words, the concavity depth was 200 nm, the servo pattern SP was formed between radius of 15.5 mm to 35.0 mm of the glass disk.

| Region No. | Number of servo zone |
|---|---|
| 1 | 1.05 |
| 2 | 2.12 |
| 3 | 4.17 |

The head slider 6 is typically comprised of two nanosliders rails with a 50 percent flat taper. The slider length is 2.0 mm, slider width is 1.6 mm, the rail width is 20 µm, the load is 3.5 gf. When a head slider 6 as described above is positioned on a glass disk with a radius of 30.2 mm, the head slider 6 and the glass disk will have a relative speed of 7 meter per second when the glass disk is rotated at 4000 rpm, and the lift amount of the head slider 6 will be approximately 50 nm.

Figure 11:
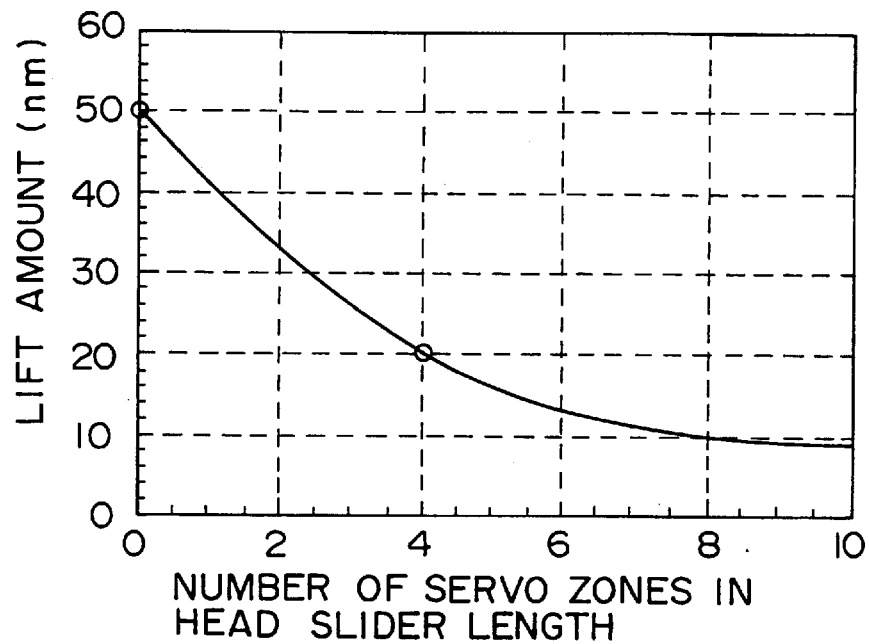
FIG. 11 is a graph showing the relationship between the lift amount of the head slider of the hard disk device shown in FIG. 1 and the number of servo zone in the head slider length projected on the glass disk .
Figure 12:
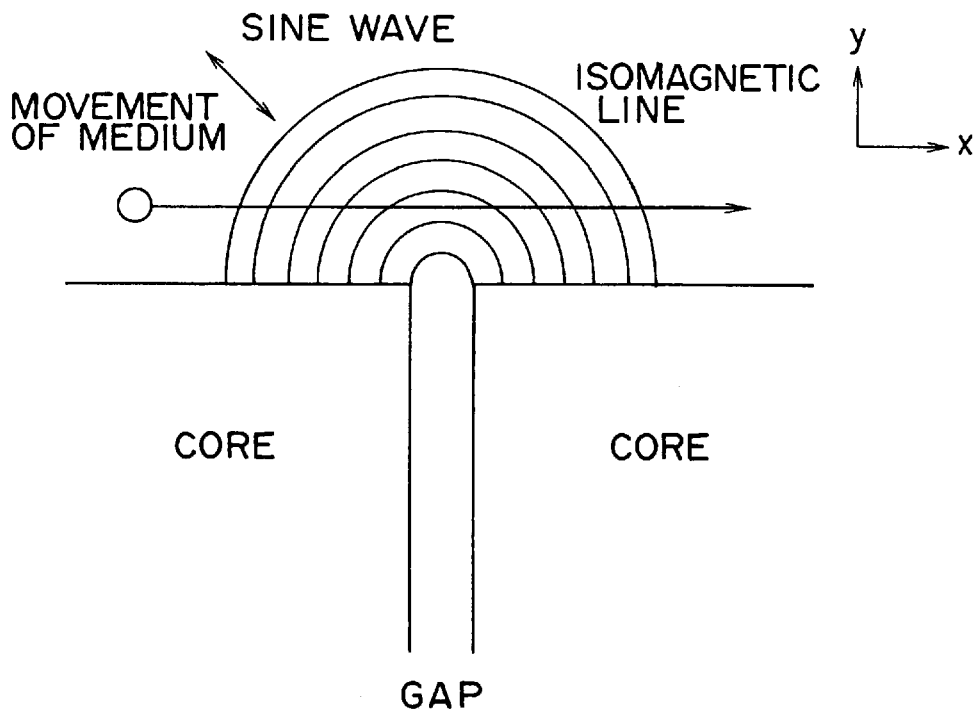
FIG. 12 is a graph describing vector magnetic field analysis.

FIG. 11 shows the relationship between the lift amount of the head slider 6 and the number of servo zones in the head slider length projected on the glass disk.

A method, in which a reference light is irradiated onto a glass disk surface (flat areas with a width of 0.4 mm in the radius direction provided at the radius positions of 20 mm, 25 mm, and 30 mm) as the reference, and a measurement light is irradiated onto the rear end of the head slider 6, and the difference is used for measurement, was used by means of a laser vibrometer, as it is obvious from the figure, the lift amount of the head slider 6 decreases as the number of servo zones in the head slider length projected on the glass disk increases. In other words, the servo zone lines or a part of servo zone lines provided on each projected length of the head slider 6 can reduce the lift amount of the head slider 6.

The number of servo zones in the head slider length projected on the glass disk of 1 or more results in the lift amount of the head slider 6 of 50 mn or smaller, and the number of servo zones in the head slider length projected on the glass disk of 4 or more results in the lift amount of the head slider 6 of 20 nm or smaller. The upper limit is desirably as high as possible for the lower limit, and the upper limit is determined by the manufacturing limit for forming servo zones and writing servo information therein. The magnetic disk 3 having protrusions and concavities is more suitable than conventional magnetic disk having a flat surface in order to achieve the lower lift of the head slider 6 which is suitable for the vertical magnetic recording system, and the recording density can be increased.

If the number of servo zones in the head slider length projected on the glass disk is smaller than 1, the area of a protrusion in the head slider length projected on the glass disk changes significantly accompanying with running of the head slider 6. The change causes the lift fluctuation of the head slider, and therefore the number of servo zones in the head slider length projected on the glass disk should be 1 or more.

The improvement of recording performance by way of the narrow spacing in the vertical magnetic recording system is described herein under. Usually, a magnetic disk enters from the front end of a magnetic gap of a magnetic head and gets out from the rear end, and the magnetic disk receives magnetic fields with various magnitude and directions during passing through.

However, the recording of a signal is determined by the magnetic field of the rear end (trailing edge) in the moving direction of the magnetic gap. The magnitude and direction of the magnetic field can be known by way of the vector magnetic field analysis. The vector magnetic field analysis analyzes involving vector the magnetic field which the magnetic medium of a disk receives during passing through the magnetic gap between cores to predict the residual magnetic history, the magnetic field received during passing the magnetic gap through to the trailing edge and the vector magnetic field at the trailing edge are revealed.

Figure 13:
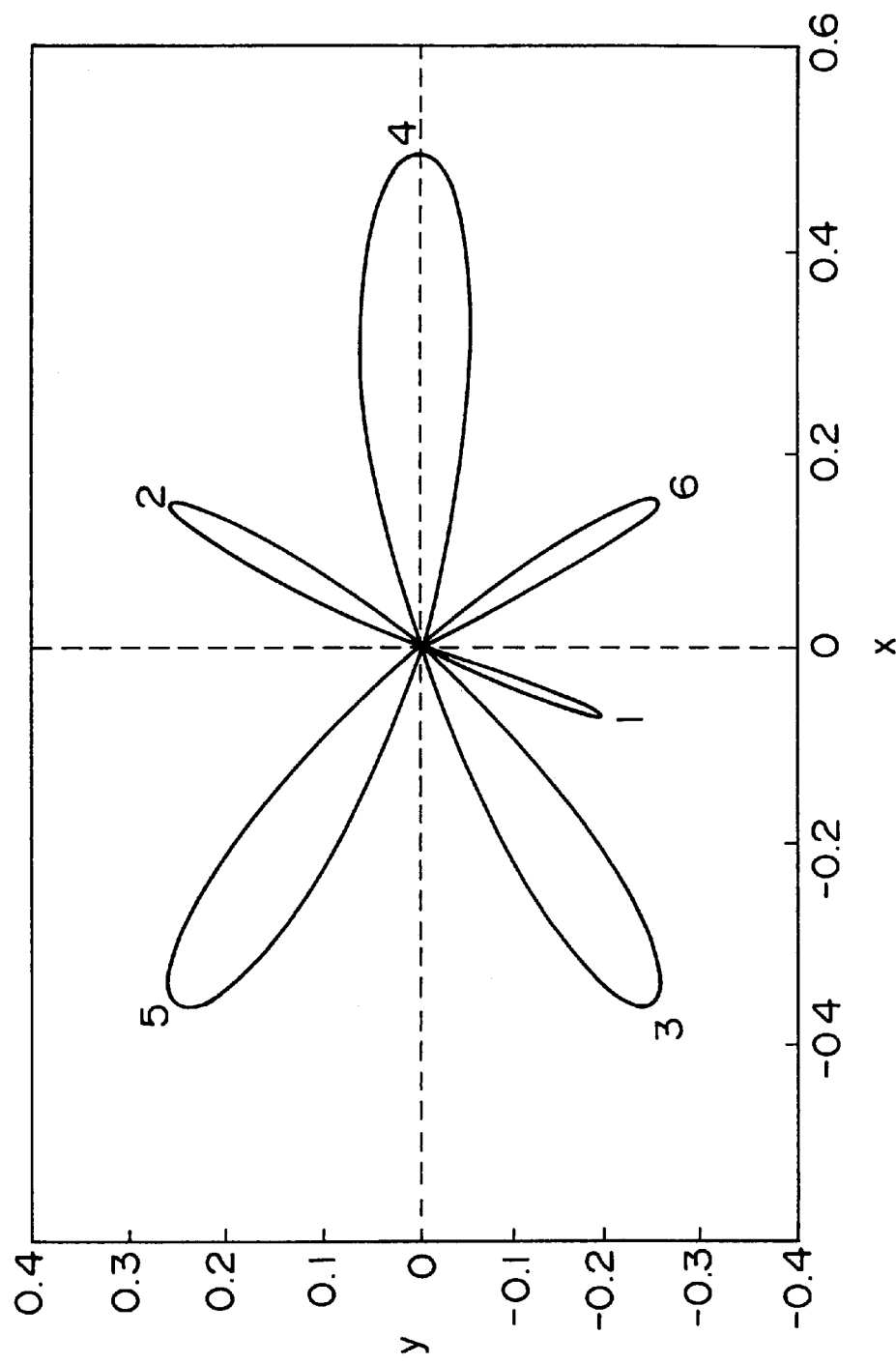
FIG. 13 is a graph showing the history of vector magnetic field.
Figure 14:
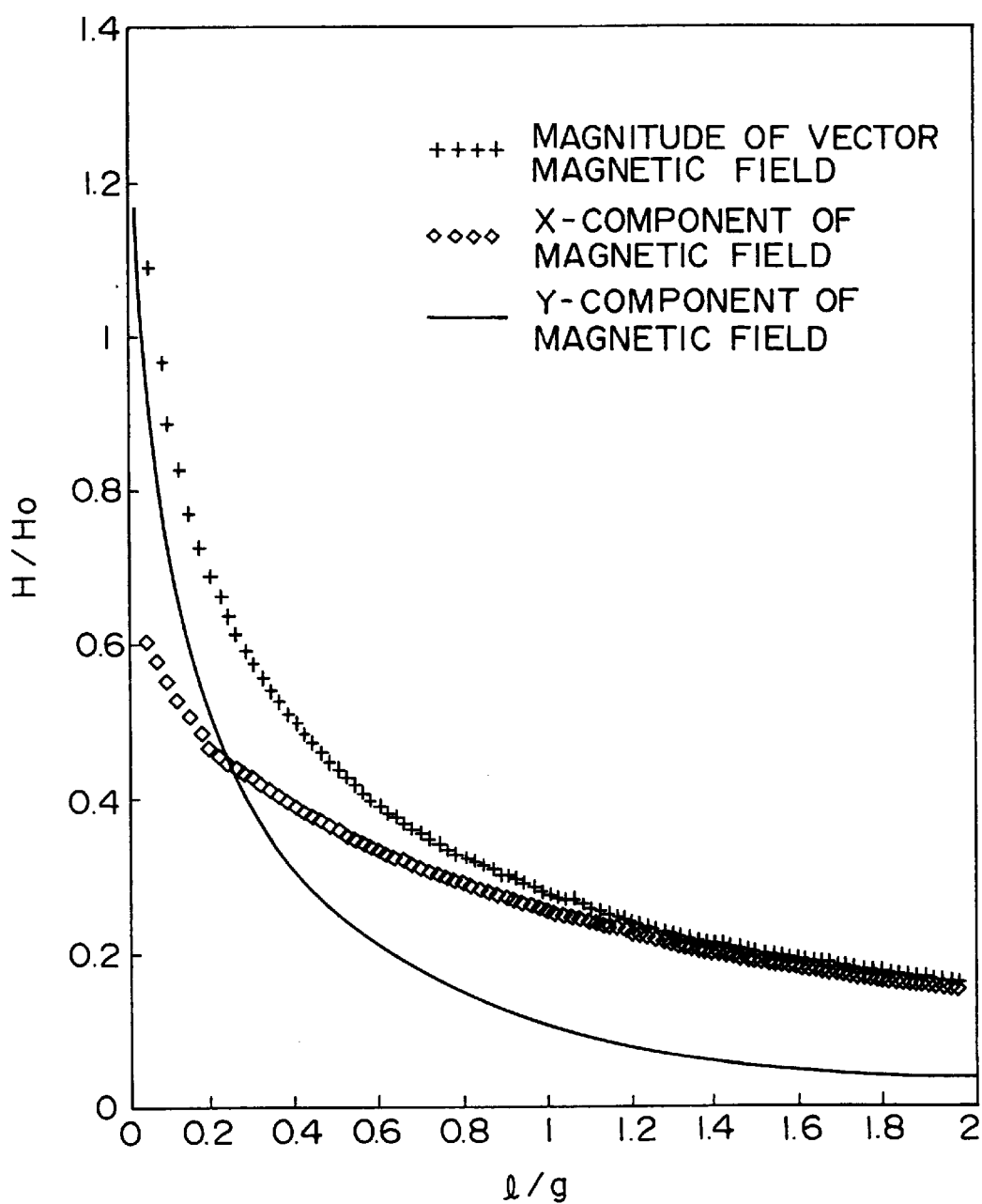
FIG. 14 is a graph showing the relationship between the magnitude of vector magnetic field at the trailing edge and x-component and y-component thereof and the value that the distance between a magnetic disk and magnetic gap is normalized with the gap length.

The history of the vector magnetic filed is shown in FIG. 13, and the relationship between the magnitude of the vector magnetic field, its x-component, and its y-component at the trailing edge and the value that the distance 1 between the magnetic disk and magnetic gap is normalized with the gap length g is shown in FIG. 14. The x-direction is the running direction of the magnetic head, therefore x-component represents the longitudinal magnetic recording and y-component represents the vertical magnetic recording.

As it is obvious from FIG. 14, in a region where the value of the distance between the magnetic disk and magnetic gap reduced with the gap length is smaller than 0.3, y-component is larger than x-component of the magnitude of the vector magnetic field at the trailing edge, and this fact suggests that it is easier for recording to employ the vertical magnetic recording system in comparison with the longitudinal magnetic recording system in this region. The usual length of a magnetic gap is 0.6 $\mu$m, the value of 0.3 times the usual length is 200 nm, and the lift amount of the head slider 6 for a magnetic disk used in the vertical magnetic recording system should be 200 nm or smaller.

As described hereinbefore, according to the present invention, because the vertical magnetic recording system which provides good lifting of a head slider and good recording condition can be employed, the recording and reproducing of information by means of a magnetic head can be performed stably, and the recording density can be increased.

What is claimed is:

1. A magnetic disk unit, comprising:

a magnetic disk;

a vertical recording magnetic head;

a slider on which said head is carried above said disk; and a pivoting support on one end of which is carried said slider;

wherein, said disk comprises data sections which extend in a circumferential direction along said disk, said disk comprises servo zones which extend approximately radially along said disk between data sections, said data sections comprise protrusions on said disk which are covered with magnetic material, said servo zones comprise protrusions and concavities covered with magnetic material, signals are recorded in said data sections as vertical magnetizations, and during operation of said unit, said slider floats above said disk by an amount less than or equal to 20 nm.

2. The magnetic disk unit of claim 1, wherein at least one of said servo zones has a length in the circumferential direction of the disk which is as long as an overall length of the slider.

3. The magnetic disk unit of claim 1, wherein at least said servo zones having circumferential lengths an overall length of said slider encompasses at least 4 servo zone circumferential lengths.

* * * * *